L. DE VITO.
DOUGH FORMING MACHINE.
APPLICATION FILED MAY 17, 1919. RENEWED JULY 30, 1921.
1,424,806.
Patented Aug. 8, 1922.
2 SHEETS—SHEET 1.
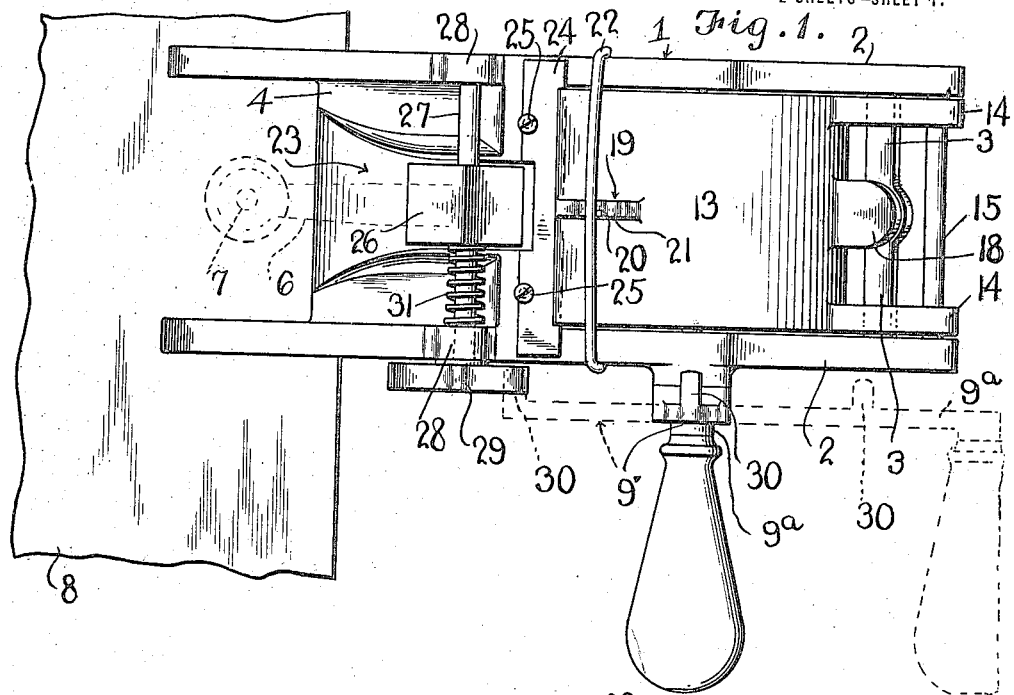
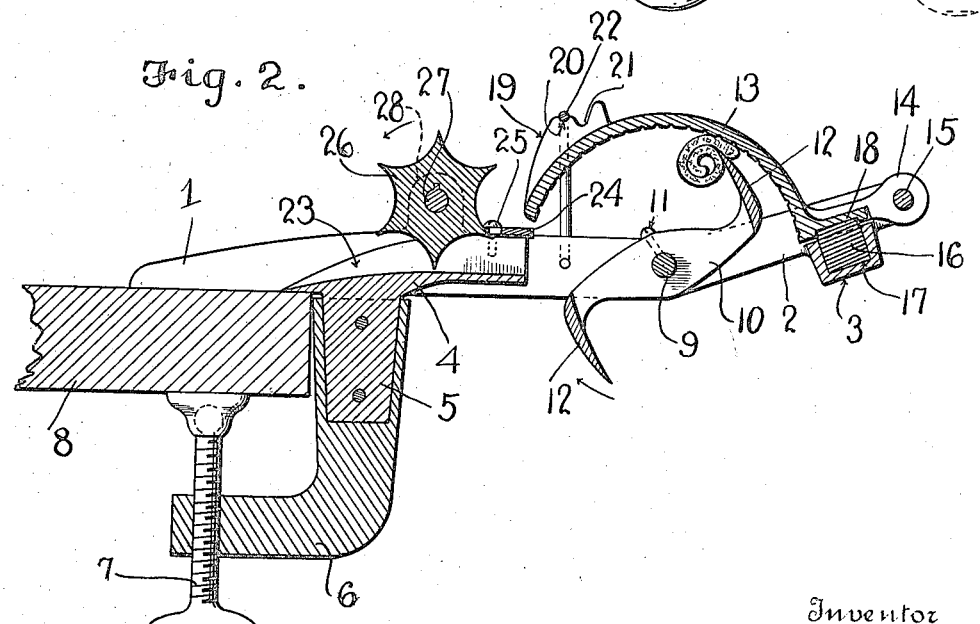
Witnesses
L. B. James
Inventor
Louis DeVito
By Victor J. Evans
Attorney

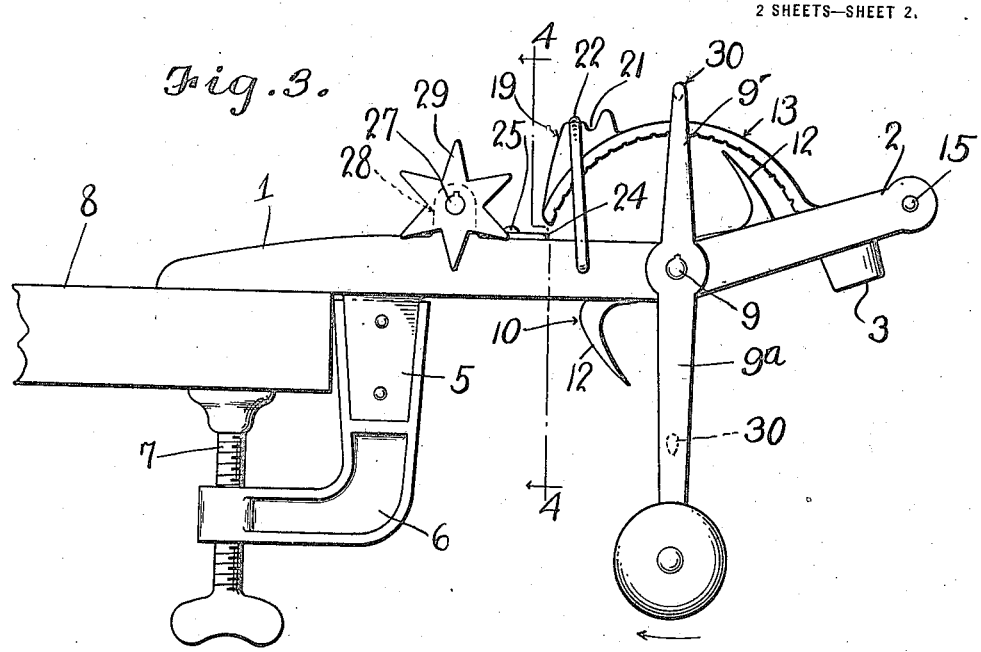

UNITED STATES PATENT OFFICE.

LOUIS DE VITO, OF CLEVELAND, OHIO.

DOUGH-FORMING MACHINE.

1,424,806. Specification of Letters Patent. Patented Aug. 8, 1922.

Application filed May 17, 1919, Serial No. 297,839. Renewed July 30, 1921. Serial No. 488,677.

*To all whom it may concern:*

Be it known that I, LOUIS DE VITO, a citizen of the United States, residing at Cleveland, in the county of Cuyahoga and State of Ohio, have invented new and useful Improvements in Dough-Forming Machines, of which the following is a specification.

This invention relates to machines for cutting strips of dough into blocks and for pressing the blocks into thin sheets and rolling the sheets spirally.

Another object of the invention is to provide means for feeding the strip of dough to the cutting and pressing means by the actuating member for the said means.

Still another object of the invention is to provide means for adjusting the parts so that the thickness of the sheets of dough may be varied.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a plan view of the device attached to a table;

Figure 2 is a longitudinal section;

Figure 3 is a side view;

Figure 4 is a section on line 4—4 of Figure 1;

Figure 5 is a perspective view of the cutting and pressing member;

Figure 6 is a perspective view of the feeding roller.

In these views 1 indicates the frame of the device which consists of the two side bars 2 connected together by the cross pieces 3 and 4. The cross piece 4 is provided with downwardly projecting lugs 5 to which is connected the bent arm 6 which carries the clamping screw 7, whereby the device may be clamped to a table, such as shown at 8. A shaft 9 is journaled in the side pieces 2 between the cross pieces and this shaft has secured thereto the crank handle 9 whereby the shaft may be rotated. The shaft also has secured thereto the cutter member 10 by the screw 11 so that said member may be adjusted on the shaft. As shown, this member is of substantially S-shape with a combined cutter and presser part 12 at each end, each part being of tapered and curved formation as shown. A substantially semicircular member 13 cooperates with the presser member for pressing the blocks of dough into thin sheets and rolling the sheets spirally and this member has lugs 14 at one of its ends which are journaled on a rod 15 carried by the frame. A spring 16 is located in a recess 17 formed in the cross piece 3 and this spring bears against an ear 18 projecting from the end of the semicircular member and this spring tends to force the member away from the member 10. The inner face of said semicircular member is corrugated or roughened as shown and the free end of its upper face is provided with a lug 19 which is provided with a shallow recess 20 and a deep recess 21. A bail 22 pivoted in the frame, is adapted to engage with one of said recesses to hold the semicircular member in operative position above the cutter member 10. By placing the bail in one or the other of the recesses 20 and 21, the said semicircular member may be adjusted in respect to the cutter member.

The cross piece 4 is provided with a channel 23 in its upper face through which the strip of dough is adapted to be passed. The inner edge of the cross piece 4 is located adjacent the path of travel of the cutter member so that said channel will direct the strip to the cutter member. At the top of the cross piece a cutter bar 24 is adjustably secured by the screws 25 and this cutter bar extends over the inner end of the channel so that as the strip of dough leaves the channel and is moved upwardly by the cutter member it will be depressed by said member against the cutter bar and thus a portion of the strip will be severed by the combined action of said cutter member and cutter bar. The severed portion will lie between the curved outer face of the part 12 of the member 10 and the corrugated face of the semicircular member 13 and as the member 10 is moved the severed portion of the dough will be pressed between the two faces and the corrugated face will tend to prevent movement of the block of dough and as the same is being pressed out into a thin sheet it will tend to curl over the thin rear edge of the part 12 and thus assume the spiral shape shown in Figure 2.

The means for feeding the strip of dough consists of a fluted roller 26 mounted on a shaft 27 journaled in lugs 28 projecting upwardly from the side bars of the frame. The end of the shaft carries a star wheel 29 which is adapted to be struck by a projection 30, one of which is carried by the crank 9 and the other by an extension 9' of said crank. The fluted wheel projects into the channel so that as the shaft is rotated it will feed the strip of dough through the channel. A coiled spring 31 is located on the shaft between the fluted wheel and one of the lugs 28 so as to frictionally hold the shaft against rotation. It will thus be seen that when the crank is turned the star wheel will be moved twice upon each revolution of the crank to feed the strip of dough through the channel, and this feeding action will take place before the cutting parts 12 reach the channel so that when these parts 12 come opposite the channel they will come in contact with the projecting part of the strip of dough and carry the same upwardly against the cutter bar and the semicircular member to cut a block from the strip and then press the block into a thin sheet and finally roll the same spirally.

As will be seen, the frame projects beyond the edge of the table so that a receptacle may be located below the cutter member into which the formed pieces of dough may drop.

What I claim is:—

1. A device of the class described comprising a frame, means therein for rolling a piece of dough into spiral shape and cutting means for the dough cooperating with a part of the before mentioned means.

2. A device of the class described comprising a frame, a semi-circular member, means for feeding a strip of dough to a point adjacent thereto, a cutter bar adjacent said point and a member for forcing dough against said cutter bar and to carry the cut piece in contact with said member to roll the same into spiral form.

3. A device of the class described comprising a frame, a feeding roller therein, combined cutting and rolling means carried by the frame and a crank for actuating the said cutting and rolling means and the feeding roller.

4. A device of the class described comprising a frame, means for feeding a strip of dough therethrough, a cutting member rotatably mounted in the frame, a curved presser member located above the rotatable member and adapted to cooperate therewith and a crank for rotating said member and actuating the feeding means.

5. A device of the class described comprising a frame having a feeding channel therein, a cutting member of substantially S-shape rotatably mounted in the frame, a semicircular member adjustably connected with the frame and located over the S-shaped member, a feeding roller in the channel, a crank handle for rotating the S-shaped member and means for rotating the feeding roller by said crank handle.

6. A device of the class described comprising a frame having a feeding channel therein, a cutter member of substantially S-shape, a cutter bar located above the channel, a semicircular member adjustably connected with the frame above the S-shaped member and adapted to cooperate therewith, a feeding roller in the channel, a crank for rotating the S-shaped member and means for rotating the feeding roller by said crank.

7. A device of the class described comprising a frame, means for clamping the same to a support, said frame having a feeding channel therein, a shaft journaled in the frame above the channel, a fluted feeding roller carried by the shaft and projecting into the channel, a star wheel carried by said shaft, an S-shaped member journaled in the frame, a cutter bar located adjacent the channel and cooperating with the S-shaped member, a semicircular member adjustably connected with the frame and located above the S-shaped member, the inner face of said semicircular member being corrugated, a crank for rotating the S-shaped member and projections on the crank for engaging the star wheel to rotate the feed roller.

In testimony whereof I affix my signature.

LOUIS DE VITO.